United States Patent [19]

Nodelman

[11] Patent Number: 4,960,537

[45] Date of Patent: Oct. 2, 1990

[54] PROCESS AND COMPOSITIONS FOR PRODUCTION OF MOLDINGS

[75] Inventor: Neil H. Nodelman, Pittsburgh, Pa.

[73] Assignee: Mobay Corporation, Pittsburgh, Pa.

[21] Appl. No.: 480,415

[22] Filed: Feb. 15, 1990

Related U.S. Application Data

[62] Division of Ser. No. 310,142, Feb. 13, 1989, Pat. No. 4,937,366.

[51] Int. Cl.$^5$ ............................................. C09K 3/00
[52] U.S. Cl. .......................... 252/182.28; 252/182.26; 528/288
[58] Field of Search ..................... 252/182.28; 528/288

[56] References Cited

U.S. PATENT DOCUMENTS

| | | | |
|---|---|---|---|
| 3,296,148 | 1/1967 | Talbert et al. ................. | 252/182.28 |
| 3,467,605 | 9/1969 | Abercrombie et al. ............. | 528/288 |
| 4,296,212 | 10/1981 | Ewen et al. ......................... | 521/163 |

*Primary Examiner*—John Kight, III
*Assistant Examiner*—Anang Sridharan
*Attorney, Agent, or Firm*—Joseph C. Gil

[57] ABSTRACT

The present invention relates to a novel chain extender for use in making moldings. The chain extender broadly comprises the reaction product of an aromatic diamine and a cyclic carboxylic acid anhydride.

3 Claims, No Drawings

PROCESS AND COMPOSITIONS FOR PRODUCTION OF MOLDINGS

This application is a division, of application Ser. No. 07/310,142 filed Feb. 13, 1989 U.S. Pat. No. 4,937,366.

BACKGROUND OF THE INVENTION

Aromatic diamines which contain at least one alkyl substituent in the ortho position to a first amino group and two alkyl substituents in the ortho position to a second group are known in the art and are described as being useful in the preparation of moldings based on polyurethane and/or polyurea chemistry. See, for example, U.S. Pat. Nos. 4,218,543; 4,269,945; 4,288,564; 4,296,212; 4,298,701; 4,379,105; 4,442,255; 4,495,081; 4,595,705; 4,595,742; and 4,607,090; and British Patent 1,534,258. In fact, one of these types of amines has met with substantial commercial use in the production of molded parts via the RIM process. Specifically, diethyltoluene diamine (DETDA) is currently being used on a large commercial scale as a chain extender for the production of polyurethane and polyurea moldings via the RIM process. Formulations based on DETDA allow for fast demold times and high productivity because of the high reactivity of DETDA. In fact, the concentration of DETDA which can be used is generally limited due to the high reactivity. Typical concentrations are in the range of from about 23 to about 25 per cent (based on the weight of all the active hydrogen containing components).

Reaction products of ethylenically unsaturated dicarboxylic acid anhydrides (e.g., maleic anhydride) and aromatic diamines are known. Thus the reaction product of one mole of such an acid with from 2 to 20 moles of diamine have been described as being useful in the preparation of epoxy based thermosetting resins (see Japanese Published Applications 57016023 and 56166225.

DESCRIPTION OF THE INVENTION

The present invention relates to the use of certain reaction products of specific aromatic diamines with cyclic carboxylic acid anhydrides. It has been discovered that when the reaction products described herein are at equivalent or even higher levels than those when using the unmodified diamine, the gel times of the systems are significantly longer. This allows the use of higher amounts of chain extender which results in stiffer parts with improved heat sag values. Additionally, the molded parts have excellent green strength.

More particularly, the present invention is directed to a process for the production of moldings by reacting an organic polyisocyanate, an 1000 to 8000 molecular weight organic active hydrogen containing material which contains at least two active hydrogen groups, and a chain extender in a closed mold, where the chain extender comprises the reaction product of (a) an aromatic diamine which contains at least one non-reactive substituent in the ortho position to a first amino group and at least one non-reactive substituent in the ortho position to a second amino group, and (b) a cyclic carboxylic acid anhydride, with the molar ratio of component (a) to component (b) being from 3:1 to 15:1, and preferably from 5:1 to 10:1.

The invention is also directed to an active hydrogen group-containing blend for use in the production of moldings comprising an organic active hydrogen group containing material having a molecular weight of from 1000 to 8000, and the above noted diamine/anhydride reaction product.

Starting polyisocyanate components suitable for use in the present invention include aliphatic, cycloaliphatic, araliphatic, aromatic and heterocyclic polyisocyanates of the type described, for example, by W. Siefken in Justus Liebigs Annalen der Chemie, 562, pages 75 to 136. Specific examples of these compounds are ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3-and -1,4-diisocyanate and mixtures of these isomers. Additional examples are 1-isocyanato-3,3,5-trimethyl-5-isocyanto-methyl cyclohexane (German Auslegeschrift No. 1,202,785, U.S. Pat. No. 3,401,190), 2,4- and 2,6-hexahydro-tolylene diisocyanate and mixtures of these isomers. Hexahydro-1,3- and/or -1,4-phenylene diisocyanate; perhydro-2,4'- and/or -4,4'-diphenylmethane diisocyanate; 1,3- and 1,4-phenylene diisocyanate; 1,4- and 2,6-tolylene diisocyanate and mixtures of these isomers are also suitable in the instant invention. Diphenylmethane-2,4-and/or -4,4'-diisocyanate; naphthylene-1,5-diisocyanate; triphenyl methane-4,4',4"-triisocyanate; polyphenyl polymethylene polyisocyanates of the type obtained by condensing aniline with formaldehyde, followed by phosgenation and described, for example, in British Patent Nos. 874,430 and 848,671 may also be used in the present invention; m- and p-isocyanato-phenylsulfonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Patent No. 1,902,007 (U.S. Pat. No. 3,152,162); diisocyanates of the type described in U.S. Pat. No. 3,492,330; and polyisocyanates containing allophanate groups of the type described, for example, in British Patent No. 993,890, in Belgian Patent No. 761,626 and in published Dutch Patent Application No. 7,102,524 are still further examples of suitable isocyanates. Additionally, polyisocyanates containing isocyanurate groups of the type described, for example, in U.S. Pat. No. 3,001,973; in German Patent Nos. 1,022,789; 1,222,067 and 1,027,394 and in German Offenlegungsschriften Nos. 1,929,034 and 2,004,408; polyisocyanates containing urethane groups of the type described, for example, in Belgian Patent No. 752,261 or in U.S. Pat. No. 3,394,164; polyisocyanates containing acylated urea groups according to German Patent No. 1,230,778 and polyisocyanates containing biuret groups of the type described, for example, in German Patent No. 1,101,394 (U.S. Pat. Nos. 3,124,605 and 3,201,372) and in British Patent No. 889,050 are also soluble.

Polyisocyanates produced by telomerization reactions of the type described, for example, in U.S. Pat. No. 3,654,106; polyisocyanates containing ester groups of the type described for example, in British Patent Nos. 965,474 and 1,072,956, in U.S. Pat. No. 3,567,763 and in German Patent No. 1,231,688; reaction products of the above-mentioned isocyanates with acetals according to German Patent No. 1,072,385 and polyisocyanates containing polymeric fatty acid residues, according to U.S. Pat. No. 3,455,883 are still further examples of suitable isocyanates.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with German Patent No. 1,618,380 (U.S. Pat. No. 3,644,457). These may be produced, for example, by reacting 1 mole of 4,4'-diisocyanato-diphenylmethane with from 0.05 to 0.3 moles of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Patent No. 1,092,007 (U.S. Pat. No. 3,152,162). Mixtures of these preferred polyisocyanates can also be used. In general, aliphatic and cycloaliphatic isocyanates are less suitable for the purposes of the instant invention.

The organic active hydrogen group-containing compounds having molecular weights of from 1000 to 8000 include compounds containing amino groups, thiol groups, carboxyl groups and hydroxyl groups.

The compounds used in the process according to the present invention are preferably polyhydroxyl polyethers or polyamino polyethers having molecular weights of from 1000 to 8000, and most preferably from 3000 to 6500. Polyethers are particularly suitable for the process of the present invention. Preferred are those having at least 2, and preferably 2 or 3 hydroxyl or amino groups. Polyhydroxyl polyethers are known and may be prepared, e.g., by polymerization of epoxides, such as ethylene oxide, propylene oxide, butylene oxide, tetrahydrofuran, styrene oxide or epichlorohydrin, either on their own, e.g., in the presence of $BF_3$, or by a process of chemical addition of these epoxides, optionally as mixtures or successively, to starting components having reactive hydrogen atoms, such as water, ammonia, alcohols or amines. Examples of suitable starting components include ethylene glycol, propylene glycol-(1,3) or -(1,2), trimethylolpropane, 4,4'-dihydroxydiphenylpropane, aniline, ethanolamine or ethylene diamine. Sucrose polyethers which have been described in German Auslegeschriften No. 1,176,358 and No. 1,064,938 may also be used according to the present invention. It is in many cases preferred to use polyethers which contain predominant amounts of primary OH groups (up to 90%, by weight, based on all the OH groups present in the polyether). Polyethers modified with vinyl polymers are also suitable. These may be obtained, for example, by the polymerization of styrene and acrylonitrile in the presence of polyethers (U.S. Pat. Nos. 3,383,351; 3,304,273; 3,523,083 and 3,110,695; and German Pat. No. 1,152,536). Polybutadienes having OH having groups may also be used.

According to the present invention, however, there may also be used polyhydroxyl compounds which contain high molecular weight polyadducts or polycondensates in a finely dispersed form or in solution. Such modified polyhydroxyl compounds are obtained when polyaddition reactions (e.g. reactions between polyisocyanates and amino functional compounds) or polycondensation reactions (e.g. between formaldehyde and phenols and/or amines) are directly carried out in situ in the above-mentioned hydroxyl compounds. Processes for the production of this type of material have been described in German Auslegeschriften Nos. 1,168,075 and No. 1,260,142 and in German Offenlegungsschriften Nos. 2,324,134; 2,423,984; 2,512,385; 2,513,815; 2,550,796; 2,550,797; 2,550,833 and 2,550,862. Such polyhydroxyl compounds may also be obtained according to U.S. Pat. No. 3,869,413 or German Offenlegungsschrift No. 2,550,860 by mixing an aqueous polymer dispersion with a polyhydroxyl compound and then removing water from the mixture.

According to the present invention, hydroxyl-containing polyesters, polythioethers, polyacetals, polycarbonates or polyester amides of the type known for the production of both homogeneous and cellular polyurethanes may also be used instead of or together with polyether polyols.

Suitable polyesters containing hydroxyl groups include, reaction products of polyhydric, (preferably dihydric alcohols), optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g., by halogen atoms, and/or may be unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, dimethyl terephthalic acid-bis-glycol esters. The following are examples of suitable polyhydric alcohols: ethylene glycol, propylene glycol-(1,2) and -(1,3), butylene glycol-(1,4) and -(2,3), hexanediol-(1,6), octanediol-(1,8), neopentylglycol, cyclohexanedimethanol (1,4-bis-hydroxymethylcyclohexane), 2-methyl-1,3-propane-diol, glycerol, trimethylolpropane, hexanetriol-(1,2,6), butanetriol-(1,2,4), trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, such as ξ-caprolactone or hydroxycarboxylic acids such as ω-hydroxycaproic acid may also be used.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythiomixed ethers, polythioether esters or polythioether ester amides, depending on the co-components.

Suitable polyacetals include, for example, the compounds which may be prepared from glycols, such as diethylene glycol, triethylene glycol, 4,4'-dioxethoxydiphenyldimethyl methane and hexanediol, and formaldehyde. Suitable polyacetals for the purpose of the present invention may also be prepared by the polymerization of cyclic acetals.

The polycarbonates containing hydroxyl groups used may be of the type known. Highly useful are those which may be prepared by the reaction of diols, such as propanediol-(1,3), butane-(1,4) and/or hexanediol-(1,6), diethylene glycol, triethylene glycol or tetraethylene glycol with diarylcarbonates, e.g., diphenylcarbonate, or phosgene.

Suitable polyester amides and polyamides include, for example, the predominantly linear condensates prepared from polybasic saturated and unsaturated carboxylic acids or the anhydrides thereof and polyvalent saturated or unsaturated amino alcohols, diamines, polyamines and mixtures thereof.

Representatives of the hydroxyl functional compounds which may be used according to the present invention are generally known and have been described, for example, in High Polymers, Vol. XVI, "Polyurethanes, Chemistry and Technology" by Saunders-Frisch, Interscience Publishers, New York, London, Volume I, 1962, pages 32-42 and pages 44-54 and Volume II, 1964, pages 5-6 and 198-199 and in Kunststoff-Handbuch, Volume VII, Vieweg-Hochtlen, Carl-Hanser-Verlag, Munich, 1966, on pages 45 to 71.

Also preferred are polyethers containing primary and/or secondary (preferably primary) aromatically or aliphatically (preferably aliphatically) bound amino groups.

Compounds containing amino end groups may also be attached to the polyether chain by urethane or ester groups. These "amino polyethers" may be prepared by known methods. One such method is the amination of polyhydroxyl polyethers (e.g., polypropylene glycol ethers) by a reaction with ammonia in the presence of Raney nickel and hydrogen (Belgian Patent No. 634,741). U.S. Pat. No. 3,654,370 discloses the preparation of polyoxyalkylene polyamines by reaction of the corresponding polyol with ammonia and hydrogen in the presence of a nickel, copper or chromium catalyst. The preparation of polyethers containing amino end groups by the hydrogenation of cyanoethylated polyoxypropylene ethers is described in German Patent No. 1,193,671. Other methods for the preparation of polyoxyalkylene (polyether) amines are described in U.S. Pat. Nos. 3,155,728 and 3,236,895 and French Patent No. 1,551,605. French Patent No. 1,466,708 discloses the preparation of polyethers containing secondary amino end groups.

Relatively high molecular weight polyhydroxypolyethers suitable for the process of the present invention may be converted into the corresponding anthranilic acid esters by reaction with isatoic acid anhydride. German Offenlegungsschriften Nos. 2,019,432 and 2,619,840 and U.S. Pat. Nos. 3,808,250; 3,975,428 and 4,016,143 disclose methods for making polyethers containing aromatic amino end groups.

Relatively high molecular weight compounds containing amino end groups may be obtained according to German Offenlegungsschrift No. 2,546,536 or U.S. Pat. No. 3,865,791 by reacting isocyanate prepolymers based on polyhydroxy polyethers with hydroxyl-containing enamines, aldimines or ketimines and hydrolyzing the reaction product.

The aminopolyethers which have been obtained by the hydrolysis of compounds containing isocyanate end groups are preferred starting materials (German Offenlegungsschrift No. 2,948,419). Polyethers preferably containing two or three hydroxyl groups are reacted (in the process disclosed in German Offenlegungsschrift No. 2,948,419) with polyisocyanates to form isocyanate prepolymers and the isocyanate group is then converted in a second step into an amino group by hydrolysis.

The "aminopolyethers" used in the present invention are in many cases mixtures of the compounds described above. These mixtures generally should contain (on a statistical average) two to three isocyanate reactive end groups.

In the process of the present invention, the "aminopolyethers" may also be used as mixtures with polyhydroxyl polyethers which are free from amino groups.

In the process according to the present invention, it is preferred to use classical polyether polyols of polyurethane chemistry or of the above noted polyether polyamines having molecular weights of from 1000 to 8000, preferably from 3000 to 6500, and containing two or three hydroxyl or amino groups. Mixtures of polyethers, of course, may also be used.

The chain extender of the present invention comprises the reaction product of specific diamines with dicarboxylic acid anhydrides. The diamines useful herein are those aromatic diamines which contain at least one non-reactive substituent in the ortho position to a first amino group, and at least one non-reactive substituent in the ortho position to a second amino group. By "non-reactive substituents" is meant a substituent that does not react with the anhydride and which does not react with either isocyanate groups or active hydrogens. It is preferred that such substituents by alkyl groups, preferably containing 1 to 4 carbon atoms. Specific alkyl substituents include methyl, ethyl, n-propyl, isopropyl, t-butyl, and/or methylthio. Specific amines useful herein include 1-methyl-3,5-diethyl-2,4- and/or -2,6-diaminobenzene, 1,3,5-triethyl-2,6-diaminobenzene, 3,5,3',5'-tetraethyl-4,4'-diaminodiphenylmethane tertiary butyl toluene diamine and the like. Useful diamines of this type are described in more detail in U.S. Pat. Nos. 4,218,543, 4,269,945, 4,288,564, 4,269,212, 4,298,701, 4,379,105, 4,442,235, 4,495,081, 4,595,705, 4,595,742, and 4,607,090, and British Patent No. 1,534,258, the disclosures of which are herein incorporated by reference. Useful cyclic carboxylic acid anhydrides useful herein include substantially any dicarboxylic acid anhydride. Specific anhydrides include succinic anhydride, glutaric anhydride, phthalic anhydride, maleic anhydride, hexahydrophthalic anhydride, tetrachloro- or tetrabromo phthalic anhydride, 1,8-naphthalic anhydride, tetrahydrophthalic anhydride, chlorendic anhydride, itaconic anhydride, and the like. It is particularly preferred to use maleic anhydride or phthalic anhydride since the resultant product is indefinitely stable in conventional polyethers used to make molded parts.

The production of the chain extender is relatively simple. The amine and anhydride are generally mixed together, typically at reaction temperatures of from 150° C. to 220° C., and held at that temperature until the acid number is at or near zero, with the water of reaction being distilled off. Where unsaturated anhydrides are used, it may be desirable to add a free radical inhibitor to prevent polymerization of the double bonds. Hydroquinone is a preferred free radical inhibitor.

The amount of chain extender used can be varied over a wide range. Typically it is used in an amount of from 5 to 50% by weight based on the combined weight of the organic active hydrogen containing material and the chain extender. It is preferred that the amount used range from 10 to 35% by weight, and most preferably from 15 to 30% by weight.

Catalyst is essential to the present invention in the case wherein only a hydroxyl functional compound or wherein a hydroxyl group containing co-chain extender is used. In these cases, it is not possible without catalyst to obtain a molding which sets rapidly in the mold and has technologically interesting mechanical properties, are preferably selected from the group of organic metal compounds known for use in polyurethane chemistry. According to the present invention, it is preferred to use organic tin compounds such as tin(II)salts of carboxylic acids, (such as tin(II)-acetate, tin(II)octoate, tin(II)ethyl hexoate or tin(II)-laurate), and the dialkyl tin salts of carboxylic acids (such as dibutyl tin diacetate, dibutyl tin dilaurate, dibutyl tin maleate or dioctyl tin diacetate) either alone or most preferably as a complex with amidines, such as 2,3-dimethyl-3,4,5,6-tetrahydropyrimidine or 2-methyl-3-cyclohexyl-3,4,5,6-tetrahydropyrimidine, aminopyridines, aminopyrimidines, hydrazino pyridines or hydrazino pyrimidines. Synergistically acting catalysts combinations of this type are known and have been described, for example, in German Offenlegungsschriften Nos. 2,434,185; 2,601,082 and 2,603,834.

Other catalysts which may be used include: known tertiary amines, such as triethylamine, tributylamine, N-methylmorpholine, N-ethylmorpholine, N-cocomorpholine, N,N,N',N'-tetramethyl-ethylenediamine, 1,4-diazabicyclo-(2,2,2)-octane, N-methyl-N'-dimethylaminoethylpiperazine, N,N-dimethylbenzylamine, bis-(N,N-diethylaminoethyl)-adipate, N,N-diethylbenzylamine, pentamethyl-diethylene-triamine, N,N'-diamethylcyclohexylamine, N,N,N',N'-tetramethyl-1,3-butanediamine, N,N-dimethyl-β-phenylethylamine, 1,2-dimethylimidazole and 2-methylimidazole. A preferred catalyst of this type is 1,4-diaza-bicyclo-(2,2,2)-octane.

Tertiary amines having isocyanate-reactive hydrogen atoms include, e.g., triethanolamine, triisopropanolamine, N-methyl-diethanolamine, N-ethyl-diethanolamine, and N,N-dimethyl-ethanolamine may also be used. Reaction products of these compounds with alkylene oxides, such as propylene oxide and/or ethylene oxide are also suitable.

Silaamines having carbon-silicone bonds as described, e.g., in German Patent No. 1,229,290 may also be used as catalysts. Examples include 2,2,4-trimethyl-2-sila-morpholine or 1,3-diethylaminomethyl-tetramethyl-disiloxane.

Basic nitrogen compounds, such as tetralkylammonium hydroxides, alkali metal hydroxides, such as sodium hydroxide, alkali metal phenolates, such as sodium phenolate, and alkali metal alcoholates, such as sodium methylate, may also be used as catalysts. Hexahydrotriazines are also suitable catalysts.

The above-mentioned catalysts may be used alone, (e.g., most preferably 1,4-diaza-bicyclo-(2,2,2)-octane) or in combination with organic metal compounds, and in particular the organic tin compounds noted above.

Other representatives of catalysts which may be used according to the present invention and details concerning the action of the catalysts may be found, e.g., in Kunststoff-Handbuch, Volume VII, published by Vieweg and Hochtlen, Carl-Hanser-Verlag, Munich, 1966, pages 96 to 102.

When used, the catalysts to be used according to the present invention should accelerate the polyaddition reaction to such an extent that once the starting components have been mixed the reactive mixture has a flow time (e.g., the capability to flow and hence the time during which the mixture may still be delivered) of less than 5, 10 or 15 seconds, and demolding times of less than 30 seconds. In general, these can be attained by using from 0.001 to 10 percent by weight of catalyst based on the total weight of component (b).

As noted herein, in some cases it is desirable to utilize a low molecular weight hydroxyl functional organic compound (or co-chain extender) having from 2 to 4 hydroxyl groups.

Compounds containing at least two hydroxyl groups and having molecular weights of from 62 to 600 may be used in the present invention as chain-extenders or cross-linkers. The co-chain extenders and cross-linking agents generally contain from 2 to 4 isocyanate-reactive hydrogen atoms. Mixtures of different compounds containing at least two hydroxyl groups and having a molecular weight of from 62 to 600 may also be used.

Examples of such low molecular weight compounds are ethylene glycol, 1,2- and 1,3-propylene glycol, 1,4-and 2,3-butylene glycol, 1,5-pentane diol, 1,6-hexane diol, 1,8-octane diol, neopentyl glycol, 1,4-bis-hydroxy methyl cyclohexane, 2-methyl-1,3-propane diol, dibromobutene diol (U.S. Pat. No. 3,723,392), glycerol, trimethylol propane, 1,2,6-hexane triol, trimethylol ethane, pentaerythritol, quinitol, mannitol, sorbitol, castor oil, diethylene glycol, triethylene glycol, tetraethylene glycol, higher polyethylene glycols having a molecular weight of up to 600, dipropylene glycol, higher polypropylene glycols having a molecular weight of up to 600, dibutylene glycol, higher polybutylene glycols having a molecular weight of up to 600, 4,4'-dihydroxydiphenyl propane, dihydroxy methyl hydroquinone, and the like.

Other low molecular weight polyols having a molecular weight of up to 600 which may be used in accordance with the present invention are ester diols, diol urethanes and diol ureas. Suitable ester diols correspond to the general formula

$$HO-(CH_2)_x-CO-O-(CH_2)_y-OH$$

and

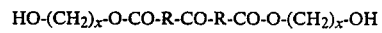

$$HO-(CH_2)_x-O-CO-R-CO-R-CO-O-(CH_2)_x-OH$$

wherein
R represents an alkylene radical containing from 1 to 10, (preferably from 2 to 6) carbon atoms or a cycloalkylene or arylene radical containing from 6 to 10 carbon atoms;
x represents 2 to 6, and
y represents 3 to 5.

Examples of compounds corresponding to these formulae are δ-hydroxybutyl-ξ-hydroxycaproic acid ester, -hydroxy-hexyl-Y-hydroxybutyric acid ester, adipic acid-bis-(β-hydroxyethyl)-ester and terephthalic acid-bis-(β-hydroxy-ethyl)-ester.

Diol urethanes which may be used in the present invention correspond to the general formula:

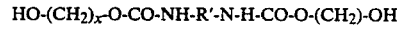

$$HO-(CH_2)_x-O-CO-NH-R'-N-H-CO-O-(CH_2)-OH$$

wherein
R' represents an alkylene radical containing from 2 to 15 (preferably from 2 to 6) carbon atoms or a cycloalkylene or arylene radical containing from 6 to 15 carbon atoms, and
x represents a number of from 2 to 6.

Examples of such diol urethanes are 1,6-hexamethylene-bis-(hydroxyethyl urethane) and 4,4'-diphenylmethane-bis-(hydroxybutyl urethane). Diol ureas suitable to the present invention correspond to the general formula

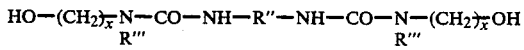

wherein
R" represents an alkylene radical containing from 2 to 15 (preferably from 2 to 9) carbon atoms or a cycloalkylene or arylene radical containing from 6 to 15 carbon atoms,
R''' represents hydrogen or a methyl group, and
x represents the number 2 or 3.

Examples of such diol ureas are 4,4'-diphenylmethane-bis-(β-hydroxyethyl urea) and the compound

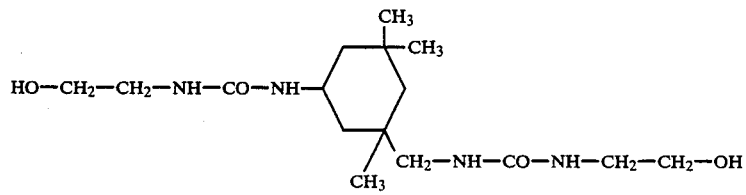

For certain purposes, it may be advantageous to use polyols containing sulfonate and/or phosphonate groups (German Offenlegungsschrift No. 2,719,372), such as the adduct of bisulfite with 1,4-butene diol or the alkoxylation product thereof.

In some instances, it may be desired to add additional quantities of amino chain extender. In such cases, any of the aromatic diamines previously described can be used.

The process according to the present invention is preferably used for producing compact moldings although blowing agents may be used. The blowing agents used may be water and/or readily volatile organic substances and/or dissolved inert gases. Suitable organic blowing agents include, e.g., acetone; ethyl acetate; methanol; ethanol; halogen substituted alkanes, such as methylene chloride, chloroform, ethylidene chloride, vinylidene chloride, monofluorotrichloromethane, chlorodifluoromethane or dichlorodifluoromethane, butane; hexane; heptane; diethyl ether; and the like. Suitable inert gases include nitrogen, air, carbon dioxide, and the like.

The effect of a blowing agent may also be obtained by adding compounds which decompose at temperatures above room temperature to liberate gas, for example, nitrogen. Examples include azo compounds, such as azoisobutyric acid nitrile. Other examples of blowing agents and details concerning the use of blowing agents may be found in Kunststoff-Handbuch, Volume VII, published by Vieweg and Hochtlen, Carl-Hanser-Verlag, Munich, 1966, pages 108 to 109, 453 to 455 and 507 to 510.

Surface-active additives (emulsifiers and foam stabilizers) may also be used according to the present invention. Suitable emulsifiers include the sodium salts of ricinoleic sulphonates or of fatty acids, or salts of fatty acids with amines, such as oleic acid diethylamine or stearic acid diethanolamine. Alkali metal or ammonium salts of sulphonic acids, such as dodecylbenzene sulphonic acid or dinaphthylmethane disulphonic acid, or of fatty acids, such as ricinoleic acid, or of polymeric fatty acids may also be used as surface active additives.

The most useful foam stabilizers are primarily water-soluble polyether siloxanes. These compounds generally have a polydimethylsiloxane group attached to a copolymer of ethylene oxide and propylene oxide. Foam stabilizers of this type are known and have been described, for example, in U.S. Pat. No. 2,764,565.

Known cell regulators, such as paraffins or fatty alcohols or dimethylpolysiloxanes, pigments, dyes, known flame retarding agents, such as bis-chloroethylphosphate or ammonium phosphate and polyphosphate, stabilizers against aging and weathering, plasticizers, fungistatic and bacteriostatic substances and fillers, such as barium sulphate, kieselguhr, carbon black or whiting, and preferably glass reinforcements in the form of flakes and/or fibers may also be used according to the present invention.

Other examples of surface active additives, foam stabilizers, cell regulators, stabilizers, flame retarding substances, plasticizers, dyes, fillers and fungistatic and bacteriostatic substances which may be used according to the present invention and details concerning the use and action of these additives are known and may be found in Kunststoff-Handbuch, Volume VII, published by Vieweg and Hochtlen, Carl-Hanser-Verlag, Munich, 1966, pages 103 to 113.

The quantity of polyisocyanate (component (a)) used in the process according to the present invention is preferably calculated so that the mixture has an isocyanate index of from 70 to 130, in particular from 90 to 110. By "isocyanate index" is meant the quotient of the number of isocyanate groups and the number of groups which are reactive with isocyanates multiplied by 100.

The reaction mixture is processed via the one-shot process. As is known in the art in the "one-shot" system, the reactive components are mixed simultaneously as opposed to the prepolymer process, wherein some of the components are prereacted. Thus, the components non-reactive with each other may first be blended and thereafter processed in a "one-shot" technique.

The known reaction injection molding technique (RIM process) may be used for carrying out the process according to the present invention. The quantity of reaction mixture (which is optionally foamable) introduced into the mold is chosen so that the molded article generally has a density of from 0.8 to 1.2 g/cc, preferably from 0.9 to 1.1 g/cc.

A starting temperature of from 10° C. to 50° C., preferably from 20° C. to 30° C. is chosen for the mixture introduced into the mold. The temperature of the mold itself is generally from 40° C. to 100° C. and preferably from 50° C. to 70° C.

Known mold-release agents of the type described, for example, in German Offenlegungsschriften Nos. 1,953,637 and 2,121,670, may also be used in the instant process.

The invention is further illustrated but is not intended to be limited by the following examples in which all parts and percentages are by weight unless otherwise specified.

EXAMPLES

EXAMPLE 1

A 12 liter 3 neck flask was charged with 8500 parts of DETDA (an 80/20 mixture of 3,5-diethyl-2,4-and 3,5-diethyl-2,6-diaminotoluene) with stirring and a nitrogen purge. The amine was heated to 100° C. 14.1 parts of hydroquinone were then added followed by addition of 680 parts of maleic anhydride. After the addition of the anhydride, the temperature was raised to 160° C., and maintained at that temperature until the acid number of 1.0 was reached. During the reaction, 102 parts of water were distilled off. Thereafter, the mixture was cooled to 100° C. and held at that temperature for 1 hour. The product was then allowed to cool to room temperature.

EXAMPLE 2

A 12 liter 3 neck flask was charged with 6466.8 parts of DETDA with stirring and a nitrogen purge. The amine was heated to 85° C. and 528 parts of succinic anhydride were slowly added thereto. When the addition was complete, the temperature was raised to 200° C. The temperature was maintained at 200° C. until the acid number had dropped to 1.0. During the reaction, 66 parts of water were distilled off. The mixture was then allowed to cool to room temperature.

EXAMPLE 3

A one liter 3 neck flask was charged with 10,000 parts of DETDA with stirring and a nitrogen purge. The amine was heated to 100° C. 1208 parts of phthalic anhydride were then added. After the addition of the anhydride, the temperature was raised to 160° C. and maintained at that temperature until the acid number had dropped to 0.01. During the reaction, 122 parts of water were distilled off. The product was then allowed to cool to room temperature.

EXAMPLES 4 THROUGH 11

RIM plaques were prepared using a laboratory piston metering unit and clamping unit. The metering unit was a two component instrument having a maximum metering capacity of 0.6 liters. A rectangular mold, 300 mm×200 mm×3 mm was used to mold samples under the following conditions:

| Component A (isocyanate) Temp. | 40° C. |
|---|---|
| Component B Temp. | 40° C. |
| Isocyanate index | 105 |
| Mold Temp. | 65° C. |
| Mix Pressure | 2940 psi |
| Demold time | 35 seconds |

The formulations used and the results obtained were as set forth in Table 1. Example 4 was a comparative example. The samples were tested for density (ASTM D-792), flex modulus (ASTM D-638), tensile strength and elongation (ASTM D-638), heat sag (ASTM D-3769), and notched Izod (ASTM D-256). The raw materials used were:

POLYOL: a glycerin initiated propylene oxide/ethylene oxide (weight ratio of propylene oxide to ethylene oxide is about 4.7:1) polyether having a hydroxyl number of 28 and a molecular weight of about 6000, and containing primary hydroxyl groups

DETDA

T-12: dibutyl tin dilaurate

33LV: Dabco 33LV, a triethylenediamine available from Air Products

ISO: Mondur PF, a modified isocyanate available from Mobay Corporation, prepared by reacting 4,4'-diphenylmethanediisocyanate with tripropylene glycol to give a liquid product having an NCO content of about 23% by weight.

TABLE 1

| EXAMPLE | 4 | 5 | 6 | 7 | 8 | 9 | 10 | 11 |
|---|---|---|---|---|---|---|---|---|
| B-SIDE: | | | | | | | | |
| POLYOL, pbw | 80 | 78.7 | 77 | 75.1 | 73.6 | 75.1 | 74.6 | 73.5 |
| DETDA, pbw | 20 | — | — | — | — | — | — | — |
| Product of Ex. 1, pbw | — | 21.3 | 23 | 24.9 | 26.4 | — | — | — |
| Product of Ex. 2, pbw | — | — | — | — | — | 24.9 | — | — |
| Product of Ex. 3, pbw | — | — | — | — | — | — | 25.4 | 26.5 |
| T-12, pbw | 0.1 | 0.1 | 0.1 | 0.1 | 0.1 | 0.1 | 0.1 | 0.1 |
| 33 LV, pbw | 0.1 | 0.1 | 0.1 | 0.1 | 0.1 | 0.1 | 0.1 | 0.1 |
| A-SIDE: | | | | | | | | |
| ISO, pbw | 51.5 | 48.2 | 51.3 | 54.8 | 57.5 | 54.8 | 53.9 | 55.8 |
| RESULTS: | | | | | | | | |
| DENSITY, pcf | 68.9 | 69.1 | 69.4 | 69.4 | 69.8 | 69.5 | 69.0 | 69.4 |
| FLEX MOD, psi × $10^3$ | 50.7 | 47.2 | 57.0 | 64.0 | 71.8 | 57.7 | 53.7 | 62.7 |
| TENS. STR., psi | 4775 | 4390 | 4250 | 4333 | 4585 | 4204 | 4770 | 4860 |
| ELONGATION, % | 310 | 290 | 240 | 260 | 246 | 330 | 355 | 340 |
| Heat Sag: | | | | | | | | |
| (4", 325° F.), mm | 37.5 | 36 | 25.5 | 27.5 | 19 | 29 | 42.5 | 34.5 |
| (6", 250° F.), mm | 27 | 30 | 11 | 19 | 23.5 | 15 | 24.5 | 30 |
| Notched Izod, ft.-lb/in. | 11.4 | 9.6 | 11.5 | 10.2 | 10.5 | 9.1 | 10.7 | 13.0 |

In addition, the formulations of Examples 4, 6 8, 10 and 11 were tested for gel times. 100 parts by weight of each formulation were introduced into an open can. Rotational viscosities were then obtained from the reacting mixtures, using a commercially available Servodyne device. The data are displayed as viscosity versus time profiles, with the point where the isocyanate is poured into the B-side being zero on the time scale. The time is then measured from this point to where the viscosity vs. time curve becomes vertical. This point is recorded as the gel time. The results obtained were as follows:

| FORMULATION | GEL TIME, seconds |
|---|---|
| 4 | 3.32 |
| 6 | 3.44 |
| 8 | 3.70 |

-continued

| FORMULATION | GEL TIME, seconds |
| --- | --- |
| 10 | 3.98 |
| 11 | 3.98 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate-reactive mixture comprising
   (i) an organic active hydrogen containing material having a molecular weight of from 1000 to 8000 and containing at least two active hydrogen groups, and
   (ii) the reaction product of
      (a) an aromatic diamine which contains at least one non-reactive substituent in the ortho position to a first amino group and at least one non-reactive substituent in the ortho position to a second amino group, and
      (b) a cyclic carboxylic acid anhydride at a molar ratio of component (a) to component (b) of from 3:1 to 15:1.

2. The mixture of claim 1, wherein said ratio is from 5:1 to 10:1.

3. The mixture of claim 1, wherein said chain extender is used in an amount of from about 5 to about 50% by weight, based on the combined weight of said active hydrogen containing material and said chain extender.

* * * * *